(12) United States Patent
Bauer et al.

(10) Patent No.: US 8,256,306 B1
(45) Date of Patent: Sep. 4, 2012

(54) HIGH-CAPACITY LOW-PROFILE LOAD CELL FOR MEASURING COMPRESSION FORCE

(75) Inventors: Robert C. Bauer, Westminster, CA (US); Gerard V. Bohr, Fountain Valley, CA (US); Marvin Luke, La Mirada, CA (US); Ben YoungSon Won, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 379 days.

(21) Appl. No.: 12/552,379

(22) Filed: Sep. 2, 2009

(51) Int. Cl.
*G01L 1/22* (2006.01)
(52) U.S. Cl. .................................................. 73/862.474
(58) Field of Classification Search ............. 73/862.474, 73/862.325
See application file for complete search history.

(56) References Cited

U.S. PATENT DOCUMENTS

| | | | |
|---|---|---|---|
| 4,312,241 A | | 1/1982 | Budraitis |
| 4,507,170 A | * | 3/1985 | Myhre ............................ 216/33 |
| 4,984,468 A | * | 1/1991 | Hafner ........................... 73/727 |
| 5,028,807 A | * | 7/1991 | Kawai et al. .................. 307/119 |
| 7,210,362 B2 | * | 5/2007 | Tsutaya ................... 73/862.627 |
| 7,260,998 B2 | | 8/2007 | Madden et al. |
| 7,739,922 B2 | * | 6/2010 | Inamori .................... 73/862.044 |
| 2003/0200818 A1 | | 10/2003 | Adrian |

OTHER PUBLICATIONS

Vishay Micro-Measurements, Tech Note TN-510-1, Revision Jul. 16, 2007.
Interface. Model LW Load Washer Spec. Sheet, LW_58_59eps, Nov. 2006.
Interface, Model LBM Compression Load Button Spec. Sheet, LBM_54, Dec. 2005.

* cited by examiner

*Primary Examiner* — Lisa Caputo
*Assistant Examiner* — Octavia Davis-Hollington
(74) *Attorney, Agent, or Firm* — Ostrager Chong Flaherty & Broitman P.C.

(57) ABSTRACT

A high-capacity low-profile load cell for measuring compression force. The load cell comprises a support ring, a diaphragm supported by the support ring, and first and second pluralities of strain gages arranged under the diaphragm for detecting strain produced by application of a load from above. The diaphragm comprises a slug portion and a plate portion that surrounds and supports the slug portion. The slug portion has a height greater than a thickness of the plate portion. The first plurality of strain gages is disposed on a bottom surface of the slug portion, while the second plurality of strain gages is disposed on a bottom surface of the plate portion. These strain gages are electrically connected to form a Wheatstone bridge.

20 Claims, 5 Drawing Sheets

HIGH-CAPACITY LOW-PROFILE LOAD CELL FOR MEASURING COMPRESSION FORCE

BACKGROUND

This invention generally relates to load cells for measuring compression force.

A load cell is a device having strain gauges for converting an applied force or load into electrical signals. The load cell is structured such that the applied force or load deforms the strain gauges. The strain gauges convert the deformation (i.e., strain) into electrical signals. A load cell usually consists of four strain gauges in a Wheatstone bridge configuration. The electrical signal output by the Wheatstone bridge is typically on the order of a few millivolts and requires amplification by an instrumentation amplifier before it can be used. The output of the load cell is processed using an algorithm to calculate the force or load being applied to the load cell.

Load cells can be used to measure reaction loads between components during structural testing. The capacity and height of the load cells must meet the particular requirements of the structure being tested. In particular cases where a low-profile high-capacity load cell was needed because the available space in the area of contact between two components was small, it was found that known off-the-shelf measuring devices with sufficient capacity had too high a profile to fit in the available envelope. In particular, load cells based on beam bending or shear web designs result in relatively thick structures.

There is a need for a load cell that matches existing devices in capacity but has a much lower profile.

BRIEF SUMMARY

The load cells disclosed herein comprise a support ring, a diaphragm supported by the support ring, and a multiplicity of strain gages arranged under the diaphragm for detecting strain produced by application of a load from above the diaphragm. The diaphragm comprises a slug portion and a plate portion that surrounds and supports the slug portion. The slug portion has a height greater than a thickness of the plate portion. A first plurality of strain gages is disposed on a bottom surface of the slug portion, while a second plurality of strain gages is disposed on a bottom surface of the plate portion. These strain gages are electrically connected to form a Wheatstone bridge.

In accordance with one embodiment, the load cell has a socket for receiving a ball-shaped end of a load-applying bolt. Alternatively, the ball could be part of the load cell while the socket is part of the load-applying bolt. A ball and socket design results in a device that is not sensitive to uneven loading around an annulus. However, the scope of the invention is not limited to such ball and socket designs. More generally, the shape of the portion of the load cell in contact with the load-applying bolt may be varied to conform to the shape of the bolt ends. For example, the end of the bolt could have an axisymmetric shape that is not spherical, while the load cell has a concavity shaped to form a seat for that axisymmetric shape. In a further alternative embodiment, the load cell has a threaded bore for receiving a threaded shaft of a load-applying bolt.

Other aspects of the invention are disclosed and claimed below.

BRIEF DESCRIPTION OF THE DRAWINGS

Reference will hereinafter be made to the drawings in which similar elements in different drawings bear the same reference numerals.

DETAILED DESCRIPTION

Various embodiments of a high-capacity low-profile load cell for measuring compression force will now be disclosed. Most other load cells are based on beam bending or shear web designs, resulting in much thicker structures. The present device is based on flat plate loading, requiring less thickness and giving the design higher compression strength.

In accordance with the various embodiments disclosed herein, the load cell has a metal body on which strain gauges for converting an applied force or load into electrical signals are mounted. The load cell is structured such that the applied force or load deforms the strain gauges. The strain gauges convert the deformation (i.e., strain) into electrical signals. More specifically, when a load is applied to the load cell, the elongation or contraction of those portions of the metal body to which the strain gages are bonded causes the resistance in the strain gages to change accordingly. The shape of the metal body and the location of the strain gages for various embodiments were selected to provide a high measurable load-carrying capability (e.g., on the order of 12,500 lb.) and a low profile.

The selection of a metal to be machined into the desired shape depends on the application, but in most cases a high-strength steel alloy that has undergone an appropriate heat treatment is preferable.

Figure 2:
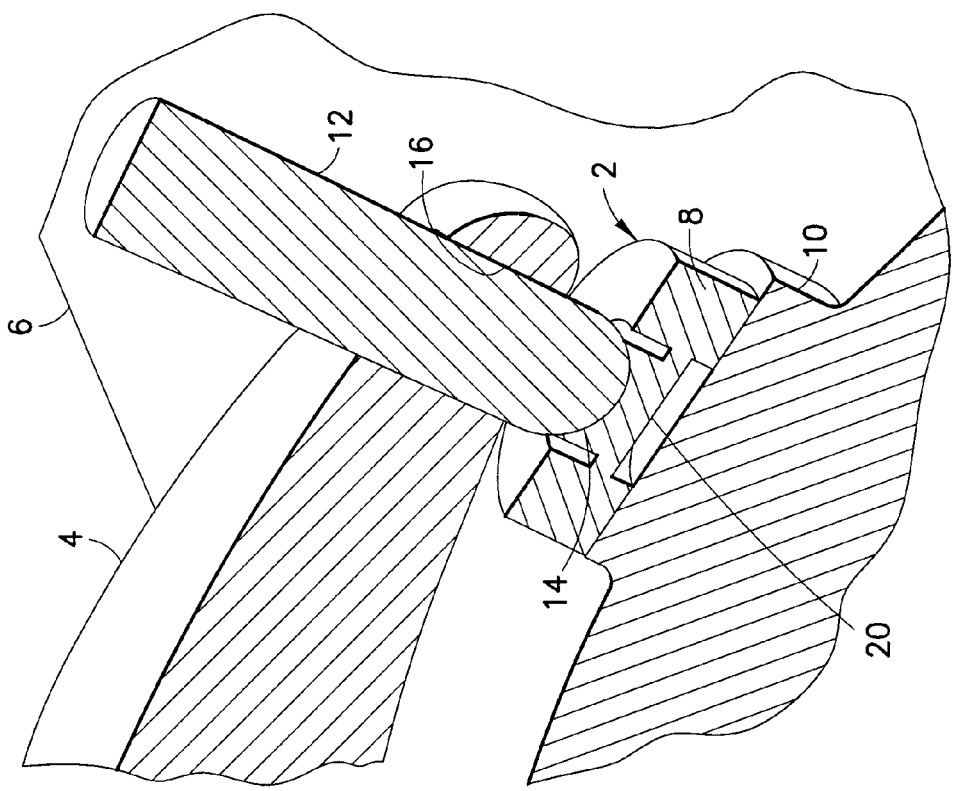
FIG. 2 is a drawing showing a sectional view of the embodiment depicted in FIG. 1, the section plane intersecting an axis of the load cell.
Figure 1:
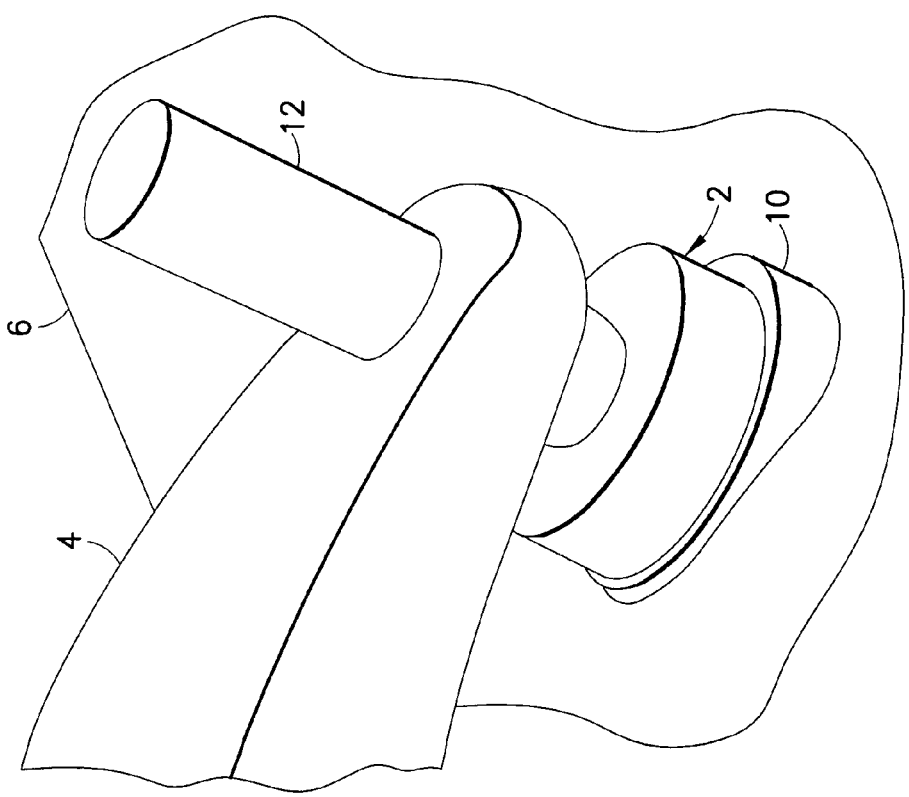
FIG. 1 is a drawing showing an isometric view of one embodiment of a load cell installed between two structural components for the purpose of measuring the compression force being exerted by one component on the other.

FIGS. 1 and 2 show one embodiment of a load cell 2 installed between two structural components for the purpose of measuring the compression force being exerted by one component on the other. In this example, the structural components consist of a sway brace 4 and a housing 6. The load cell 2 comprises a support ring 8 having a flat bottom surface that sits on a flat surface of a boss 10 that protrudes from the housing and is integrally formed therewith, as best seen in FIG. 2. Preferably the support ring 8 is circular. The compressive load is applied to the load cell 2 by way of a bolt 12 having a ball-shaped (e.g., partially spherical) end 14. The bolt 12 has threads (not shown in FIG. 2) which are threadably coupled to a threaded bore 16 formed in the brace, the threads of which are also not shown.

Figure 3:
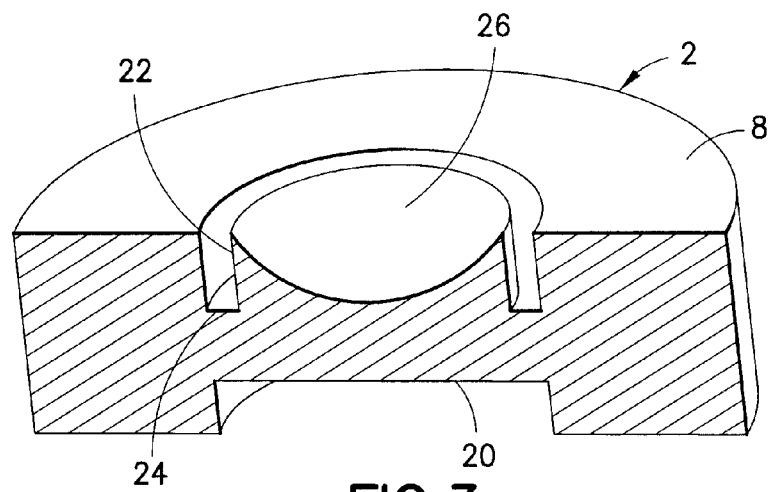
FIGS. 3-5 are drawings showing sectional, top and bottom views respectively of the load cell depicted in FIG. 1.

The load cell 2 is shown in section in FIG. 3. This load cell can be formed by machining a circular metal disk. The load cell 2 comprises support ring 8 and a diaphragm 20 surrounded and supported by the support ring 8. The diaphragm is designed to flex when the load is applied by the aforementioned bolt 12 (see FIG. 2). More specifically, the diaphragm 20 comprises a slug portion 22 and an annular plate portion 24 surrounding and supporting the slug portion 22. As can be seen in FIG. 3, the slug portion 22 has a height greater than the thickness of the plate portion 24. The thickness of plate portion 24 is substantially constant. The slug portion 22 is preferably symmetric about its axis and centered on the diaphragm.

The slug portion 22 is configured to provide a seat for the ball-shaped end of the load-applying bolt 12. In this example, the seat is a concavity 26 having a surface that is partially spherical. The radius of concavity 26 is preferably only slightly greater than the radius of the ball shape at the end of the load-applying bolt. The structure of the load cell is based on flat plate loading with "built-in" edge conditions, meaning that the plate portion 24 is supported about its entire perimeter by the support ring 8. This construction provides the highest stresses at the perimeter of the plate portion 24. Force is applied in the concavity 26 through the ball-shaped end of the bolt 12. Loading causes the plate portion 24 to flex while the slug portion 22 remains static. The ball and socket design results in the load cell not being sensitive to uneven loading around the slug.

While the load cell design of the present invention is not limited to any particular dimensions or range of dimensions, an initial sizing for one exemplary device of the type seen in FIG. 3 includes the following dimensions: the height of the support ring 8 is 0.5 inch; the outer diameter of the support ring 8 was 1.625 inch; the inner diameter of the support ring 8 (and outer diameter of the diaphragm 20) was 0.75 inch; the thickness of the plate portion 24 of the diaphragm was 0.21 inch; and the inner diameter of the plate portion 24 of the diaphragm (and the outer diameter of the slug portion 22 of the diaphragm) was 0.625 inch. Consequently, the radial dimension of the plate portion 24 was 0.0625 inch. The load cell 2 having the foregoing dimensions was intended to have a working load of 15,000 lbs.

Figure 4:
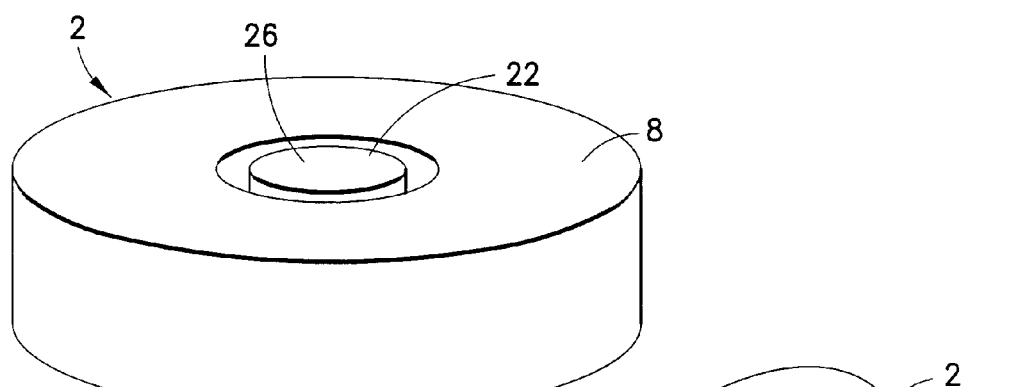
Figure 5:
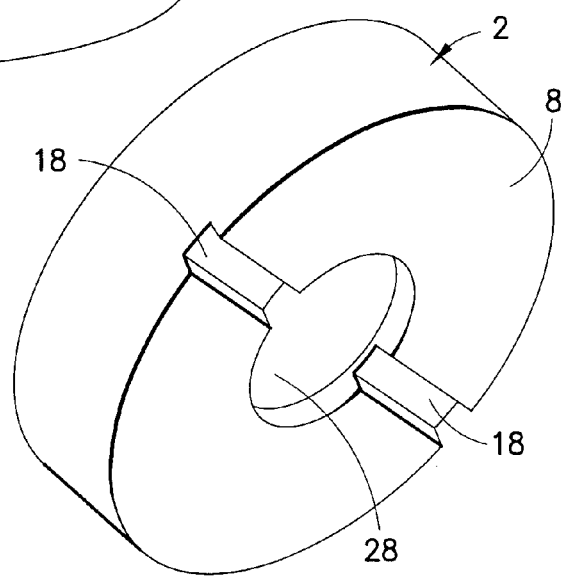

FIGS. 4 and 5 show two views of an alternative load cell 2 design in which the support ring 8 has the same outer diameter, but a lesser inner diameter than the cell depicted in FIG. 3. Also the slug portion 22 seen in FIG. 4 has an outer diameter which is less than the slug outer diameter depicted in FIG. 3. Item 26 in FIG. 4 indicates a partially spherical concavity that serves as the seat for the partially spherical end of a bolt, as previously described. Item 18 in FIG. 4 indicates a wire notch described in more detail in the next paragraph.

Referring to FIG. 5, the bottom surface of the diaphragm 20 is flat in an unflexed state. An array of strain gages (not shown in FIG. 5) will be bonded to that bottom surface, as will be described in more detail hereinafter. A pair of collinear wire notches 18 are formed in the bottom of the support ring 8 to provide clearance for wires (not shown) that will be connected to the strain gages bonded to the diaphragm.

Figure 6:
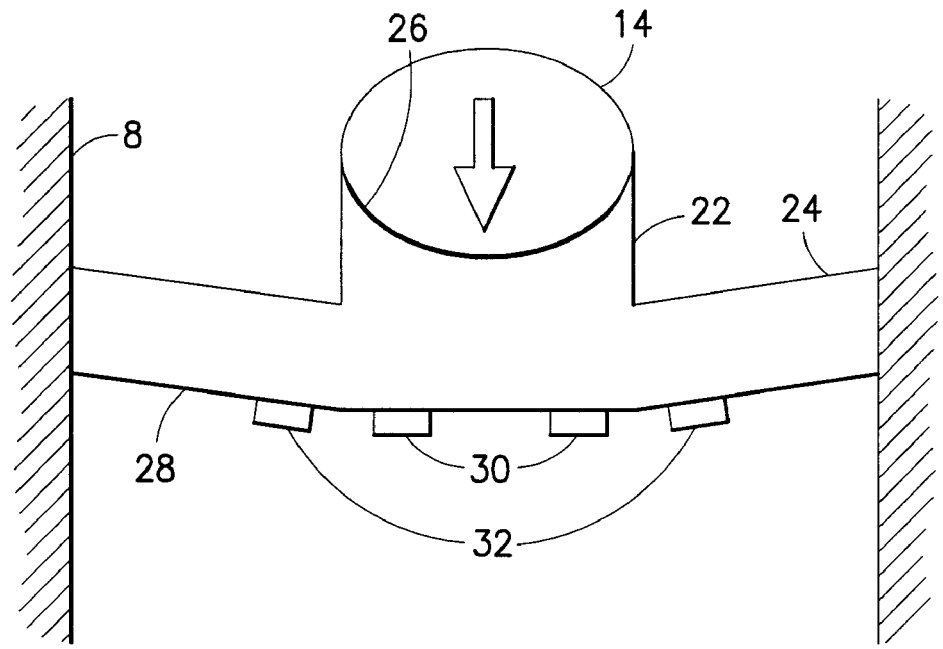
FIG. 6 is a diagram showing a sectional view of a diaphragm supported on its periphery by a support ring, which diaphragm is being flexed by application of a load, the direction of the load being indicated by an arrow.
Figure 7:
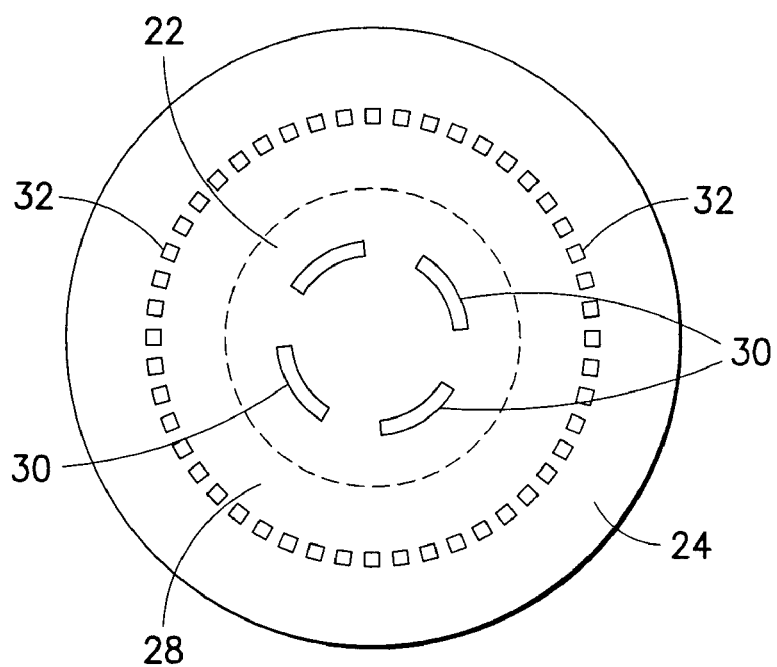
FIG. 7 is a drawing showing the placement of strain gages on the bottom of a diaphragm of a load cell in accordance with one embodiment.

As seen in FIGS. 6 and 7, a multiplicity of strain gages are arranged on the bottom surface 28 of the diaphragm 20 for detecting strain (the support ring is not shown). A first plurality of strain gages 30 are located underneath the slug portion 22 (indicated by the dashed circle), and a second plurality of strain gages 32 are located under the plate portion 24. The strain gages 32 installed on the plate portion read the increase in strain due to loading. The strain gages 30 on the unaffected slug portion complete the circuit.

Figure 8:
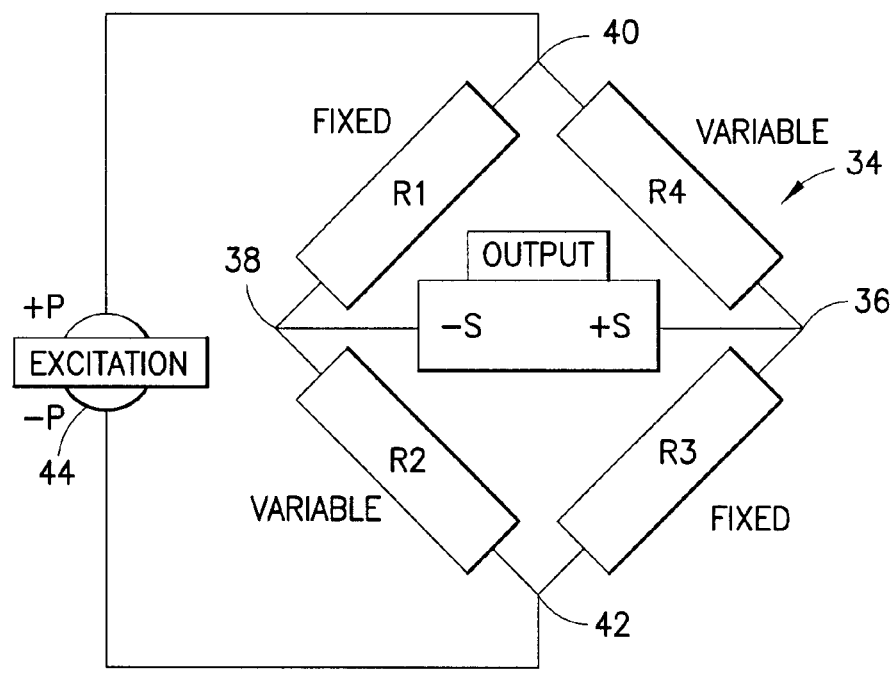
FIG. 8 is a diagram showing a full-bridge circuit, referred to herein as a Wheatstone bridge, the strain gages of the load cell being electrically connected to form such a circuit.

In accordance with the preferred embodiments, the strain gages are connected to a full bridge circuit (i.e., Wheatstone bridge) 34, diagrammatically depicted in FIG. 8. A full bridge circuit used on a load cell works by applying an excitation voltage across two voltage divider resistor networks and measuring the differential voltage between the two divider output nodes 36, 38. The two divider input nodes 40, 42 are respectively electrically connected to the +P and −P terminals of an excitation source 44. As the resistance in the strain gage resistors R2 and R4 is changed by straining the metal they are bonded to, the output signal S changes a proportionate amount. The output device can be a signal conditioner, a galvanometer, a multi-meter, etc., depending on what is to be done to the signal, e.g., reading only, recording, etc. In this load cell application, the resistance in the R1 and R3 resistors does not change significantly.

Figure 9:
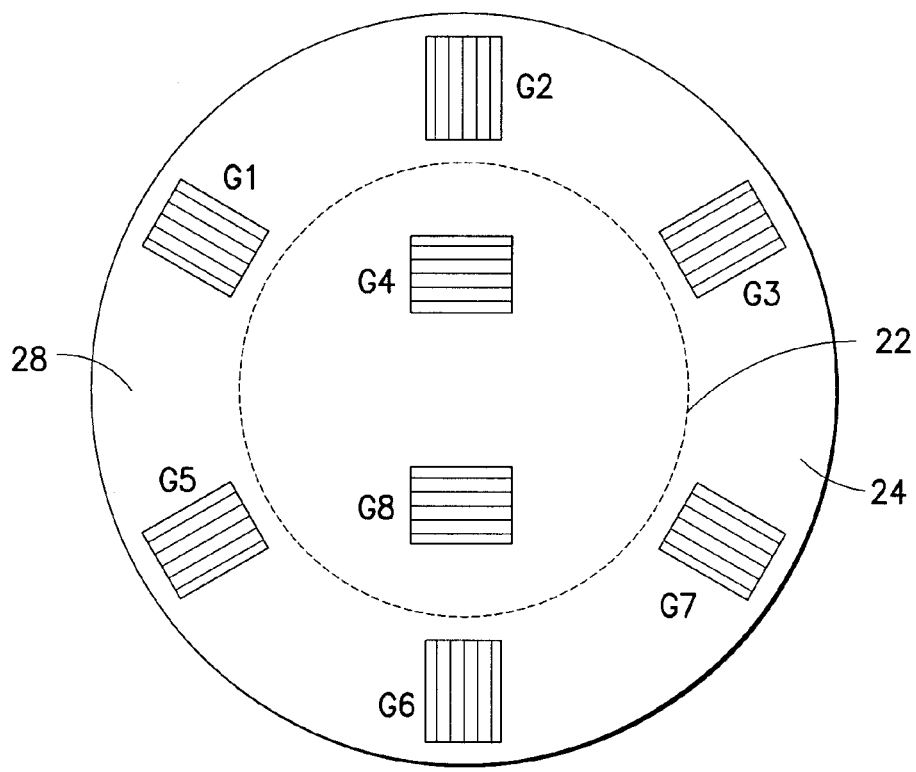
FIG. 9 is a drawing showing the placement of strain gages on the bottom of a diaphragm of a load cell in accordance with another embodiment.

FIG. 9 depicts an exemplary strain gage pattern for use with the full bridge circuit depicted in FIG. 8. Gages G1, G2 and G3 seen in FIG. 9 are wired in parallel to form variable resistor R4 seen in FIG. 8. Gages G5, G6 and G7 seen in FIG. 9 are wired in parallel to form variable resistor R2 seen in FIG. 8. Gage G4 in FIG. 9 is fixed resistor R1 in FIG. 8, while gage G8 in FIG. 9 is fixed resistor R3 in FIG. 8.

In accordance with the arrangement depicted in FIG. 9, the strain gages intended to work as variable resistors are installed with their grid systems aligned radially from the center over the plate (stressed) portion 24 of the diaphragm. Increasing the number of gages reduces the sensitivity of the device to out-of-perpendicular loads. The strain gages intended to work as fixed resistors are installed with their grid systems aligned in hoop under the slug (insensitive) portion 22 of the diaphragm.

Preferably each of strain gages G1-G8 is a serpentine electrical conductor with segments connected in series. For gages G1-G3 and G5-G7 the segments of each serpentine conductor may be straight lines arranged radially or in parallel. For gages G4 and G8 the segments of each serpentine conductor may be arranged as concentric arcs or as parallel straight lines. In the case where straight line grids are used, the center of each gage is installed in either the radial or tangential (to the hoop) direction. As long as the error introduced is repeatable, the device will still work, albeit with greater sensitivity to side loading.

Figure 10:
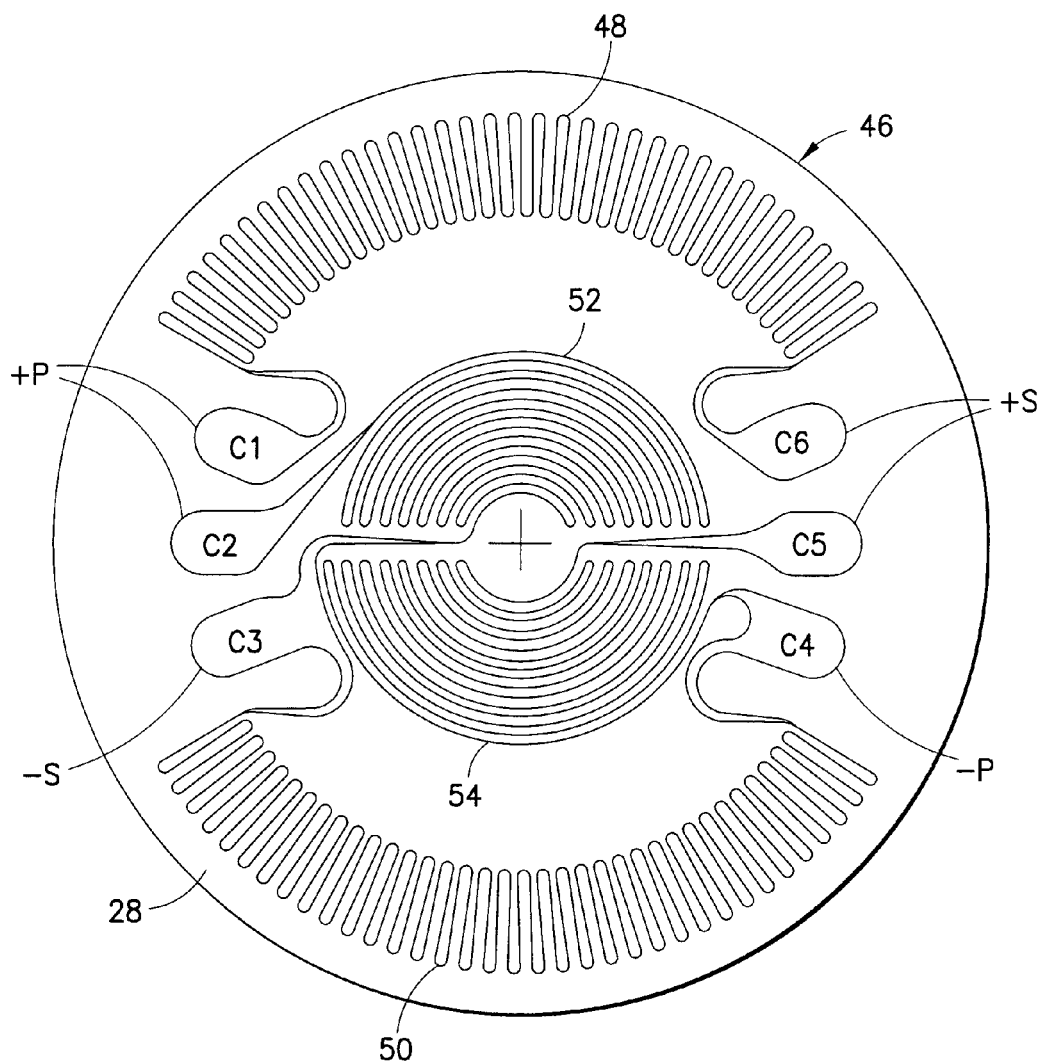
FIG. 10 is a drawing the placement of strain gages on the bottom of a diaphragm of a load cell in accordance with a further embodiment.

Depending on the size of the load cell, it is possible to use a single diaphragm strain gage rather than installing the eight strain gages depicted in FIG. 9. This would reduce the amount of effort required to fabricate the device. The drawback of using a standard gage pattern was reduced sensitivity of the device since the gages would not be at the peak stress locations of the load cell design. However, the device still measured changed output that varied with load and produced repeatable results. The gage selected was a circular pattern diaphragm strain gage 46, shown in FIG. 10, commercially available from Vishay Intertechnology Inc. The top and bottom gage grids 48, 50 are oriented radially from the center of the gage. The center grid patterns 52, 54 are oriented in a hoop direction. The top gage grid 48 is electrically connected to contacts C1 and C6. The bottom gage grid 50 is electrically connected to contacts C3 and C4. The center grid 52 is electrically connected to contacts C2 and C3. The center grid 54 is electrically connected to contacts C4 and C5. Contacts C1 and C2 are electrically connected to the +P terminal of the excitation source. Contact C4 is electrically connected to the −P terminal of the excitation source. Contacts C5 and C6 are electrically connected to the node that outputs the +S signal. Contact C3 is electrically connected to the node that outputs the −S signal.

The ball and socket design described above helps ensure that the applied load goes through the center of the load cell. However, the slug portion could be solid (not concave), or drilled and tapped for attachment to the load-applying bolt without departing from the scope of the invention.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention.

As used in the claims hereinafter, the term "plurality" means two or more.

The invention claimed is:

1. A load cell comprising a support ring, a diaphragm surrounded and supported by said support ring, and first and second pluralities of strain gages arranged on said diaphragm for detecting strain, said support ring and said diaphragm being respective portions of a single machined body, said diaphragm comprising a slug portion and a plate portion surrounding and supporting said slug portion, said slug portion having a height greater than a thickness of said plate portion, said first plurality of strain gages being disposed on a bottom surface of said slug portion, and said second plurality of strain gages being disposed on a bottom surface of said plate portion, wherein an area of said slug portion is greater than an area of said plate portion.

2. The load cell as recited in claim 1, wherein said slug portion has a circumference and a radius, said plate portion has inner and outer circumferences and inner and outer radii, and said radius of said slug portion is greater by a factor of about 5 than a radial length of said plate portion, said radial length being equal to a difference between said inner and outer radii of said plate portion.

3. The load cell as recited in claim 1, wherein said first plurality of strain gages comprises first and second strain gages, each of said first and second strain gages comprising a multiplicity of tangential grid elements electrically connected in series, and wherein said second plurality of strain gages comprises third and fourth strain gages, each of said third and fourth strain gages comprising a multiplicity of radial grid elements electrically connected in series.

4. The load cell as recited in claim 1, wherein said slug portion is symmetrical about its axis, and said support ring and said slug portion are concentric.

5. The load cell as recited in claim 1, wherein said slug portion comprises a socket for receiving a portion of a ball.

6. The load cell as recited in claim 1, wherein said slug portion comprises a concavity having a partially spherical surface.

7. The load cell as recited in claim 1, wherein said slug portion comprises a threaded bore.

8. The load cell as recited in claim 1, wherein a ratio of said area of said slug portion to said area of said plate portion is greater than 2.

9. The load cell as recited in claim 1, wherein said support ring has a height substantially greater than a thickness of said plate portion.

10. The load cell as recited in claim 1, wherein said support ring comprises a notch for a wire.

11. A method for producing electrical signals from which a magnitude of a reaction load can be determined, comprising the following steps:

placing a load cell on a surface of a first structural component, said load cell comprising a support ring that contacts said surface of said first structural component, a diaphragm surrounded and supported by said support ring, and first and second pluralities of strain gages arranged under said diaphragm for detecting strain, said support ring and said diaphragm being respective portions of a single machined body, said diaphragm comprising a slug portion and a plate portion surrounding and supporting said slug portion, said slug portion having a height greater than a thickness of said plate portion, said first plurality of strain gages being disposed on a bottom surface of said slug portion, and said second plurality of strain gages being disposed on a bottom surface of said plate portion, wherein an area of said slug portion is greater than an area of said plate portion;

placing an end of a second structural component so that said end contacts said slug portion of said diaphragm of said load cell; and outputting electrical signals from said first and second pluralities of strain gages while said second structural component applies a load to said slug portion via said end.

12. The method as recited in claim 11, wherein said slug portion has a circumference and a radius, said plate portion has inner and outer circumferences and inner and outer radii, and said radius of said slug portion is greater by a factor of about 5 than a radial length of said plate portion, said radial length being equal to a difference between said inner and outer radii of said plate portion.

13. The method as recited in claim 11, wherein said first plurality of strain gages comprises first and second strain gages, each of said first and second strain gages comprising a multiplicity of tangential grid elements electrically connected in series, and wherein said second plurality of strain gages comprises third and fourth strain gages, each of said third and fourth strain gages comprising a multiplicity of radial grid elements electrically connected in series.

14. The method as recited in claim 11, wherein said end of said second structural component is round and said slug portion comprises a socket for receiving said end.

15. The method as recited in claim 11, wherein a portion of said second structural component is threaded and said slug portion comprises a threaded bore for receiving said threaded portion of said second structural component.

16. A system for producing electrical signals from which a magnitude of a reaction load can be determined, comprising:

a first structural component;

a load cell comprising a support ring that is in contact with a surface of said first structural component, a diaphragm surrounded and supported by said support ring, and first and second pluralities of strain gages arranged under said diaphragm for detecting strain, said support ring and said diaphragm being respective portions of a single machined body, said diaphragm comprising a slug portion and a plate portion surrounding and supporting said slug portion, said slug portion having a height greater than a thickness of said plate portion, said first plurality of strain gages being disposed on a bottom surface of said slug portion, and said second plurality of strain gages being disposed on a bottom surface of said plate portion, wherein an area of said slug portion is greater than an area of said plate portion; and a second structural component comprising an end that contacts said slug portion of said diaphragm of said load cell.

17. The system as recited in claim 16, wherein said slug portion has a circumference and a radius, said plate portion has inner and outer circumferences and inner and outer radii, and said radius of said slug portion is greater by a factor of about 5 than a radial length of said plate portion, said radial length being equal to a difference between said inner and outer radii of said plate portion.

18. The system as recited in claim 16, wherein said first plurality of strain gages comprises first and second strain gages, each of said first and second strain gages comprising a multiplicity of tangential grid elements electrically connected in series, and wherein said second plurality of strain gages comprises third and fourth strain gages, each of said third and fourth strain gages comprising a multiplicity of radial grid elements electrically connected in series.

19. The system as recited in claim 16, wherein said end of said second structural component is partially spherical and said slug portion comprises a socket for receiving said end.

20. The system as recited in claim 16, wherein a portion of said second structural component is threaded and said slug portion comprises a threaded bore for receiving said threaded portion of said second structural component.

* * * * *